US011170585B2

(12) United States Patent
Sankavaram et al.

(10) Patent No.: US 11,170,585 B2
(45) Date of Patent: Nov. 9, 2021

(54) VEHICLE FAULT DIAGNOSIS AND ANALYSIS BASED ON AUGMENTED DESIGN FAILURE MODE AND EFFECT ANALYSIS (DFMEA) DATA

(71) Applicant: GM GLOBAL TECHNOLOGY OPERATIONS LLC, Detroit, MI (US)

(72) Inventors: Chaitanya Sankavaram, Rochester Hills, MI (US); Dnyanesh G. Rajpathak, Troy, MI (US); Azeem Sarwar, Rochester Hills, MI (US); Xiangxing Lu, Sterling Heights, MI (US); Dean G. Sorrell, Rochester Hills, MI (US); Layne K. Wiggins, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 150 days.

(21) Appl. No.: 16/443,383

(22) Filed: Jun. 17, 2019

(65) Prior Publication Data

US 2020/0394850 A1    Dec. 17, 2020

(51) Int. Cl.
*G07C 5/00* (2006.01)
*G07C 5/08* (2006.01)
*G07C 5/02* (2006.01)
*G06N 20/00* (2019.01)

(52) U.S. Cl.
CPC ............... *G07C 5/008* (2013.01); *G07C 5/02* (2013.01); *G07C 5/08* (2013.01); *G06N 20/00* (2019.01)

(58) Field of Classification Search
USPC ....................................................... 701/31.4
See application file for complete search history.

(56) References Cited

U.S. PATENT DOCUMENTS

2013/0080172 A1\* 3/2013 Talwar .................... G10L 25/69
704/260
2020/0394850 A1\* 12/2020 Sankavaram ............ G07C 5/08

\* cited by examiner

*Primary Examiner* — Tyler D Paige
(74) *Attorney, Agent, or Firm* — Harness, Dickey & Pierce, P.L.C.

(57) ABSTRACT

A system and method of performing fault diagnosis and analysis for one or more vehicles. The method includes: obtaining design failure mode and effect analysis (DFMEA) data that specifies a plurality of failure modes; receiving diagnostic association data; receiving vehicle operation signals association data; generating augmented DFMEA data that indicates a causal relationship between the diagnostic data and the first set of failure modes, and that indicates a causal relationship between the vehicle operation signals data and the second set of failure modes, wherein the augmented DFMEA data is generated based on the DFMEA data, the diagnostic association data, and the vehicle operation signals association data; and performing fault diagnosis and analysis for the one or more vehicles using the augmented DFMEA data.

20 Claims, 3 Drawing Sheets

VEHICLE FAULT DIAGNOSIS AND ANALYSIS BASED ON AUGMENTED DESIGN FAILURE MODE AND EFFECT ANALYSIS (DFMEA) DATA

INTRODUCTION

The present invention relates to performing fault diagnosis and analysis for one or more vehicles based on augmented design failure mode and effect analysis (DFMEA) data.

Vehicles include hardware and software capable of obtaining and processing various information, including information that is obtained by vehicle system modules (VSMs). Service technicians can diagnose certain vehicle problems using an onboard diagnostic (OBD) tool, such as a tool that plugs into or connects to an OBD II port of a vehicle. Also, as a part of manufacturing the vehicle, design failure mode and effect analysis (DFMEA) data is generated.

SUMMARY

According to one aspect of the invention, there is provided a method of performing fault diagnosis and analysis for one or more vehicles. The method includes: obtaining design failure mode and effect analysis (DFMEA) data, wherein the DFMEA data specifies a plurality of failure modes; receiving diagnostic association data, wherein the diagnostic association data specifies, for each of a first set of the plurality of failure modes, diagnostic data that is to be associated with the failure mode; receiving vehicle operation signals association data, wherein the vehicle operation signals association data specifies, for each of a second set of the plurality of failure modes, vehicle operation signals data that is to be associated with the failure mode; generating augmented DFMEA data that indicates a causal relationship between the diagnostic data and the first set of failure modes, and that indicates a causal relationship between the vehicle operation signals data and the second set of failure modes, wherein the augmented DFMEA data is generated based on the DFMEA data, the diagnostic association data, and the vehicle operation signals association data; and performing fault diagnosis and analysis for the one or more vehicles using the augmented DFMEA data.

According to various embodiments, this method may further include any one of the following features or any technically-feasible combination of some or all of these features:
- the DFMEA data includes or is based on a first DFMEA document that is generated as a part of designing, developing, manufacturing, and/or testing a first subsystem of the one or more vehicles, wherein the DFMEA data includes or is based on a second DFMEA document that is generated as a part of designing, developing, manufacturing, and/or testing a second subsystem of the one or more vehicles;
- the plurality of failure modes includes a plurality of first subsystem failure modes and a plurality of second subsystem failure modes, wherein the plurality of first subsystem failure modes specifies failure modes pertaining to the first subsystem, and wherein the plurality of second subsystem failure modes specifies failure modes pertaining to the second subsystem;
- the augmented DFMEA data includes a first augmented DFMEA document and a second augmented DFMEA document, wherein the first augmented DFMEA document indicates the causal relationship between the diagnostic data and a third set of failure modes, wherein the third set of failure modes are those failure modes that are a part of the first set of failure modes and the first subsystem failure modes, wherein the first augmented DFMEA document indicates the causal relationship between the vehicle operation signals data and a fourth set of failure modes, and wherein the fourth set of failure modes are those failure modes that are a part of the second set of failure modes and the first subsystem failure modes;
- the second augmented DFMEA document indicates the causal relationship between the diagnostic data and a fifth set of failure modes, wherein the fifth set of failure modes are those failure modes that are a part of the first set of failure modes and the second subsystem failure modes, wherein the second augmented DFMEA document indicates the causal relationship between the vehicle operation signals data and a sixth set of failure modes, and wherein the sixth set of failure modes are those failure modes that are a part of the second set of failure modes and the second subsystem failure modes;
- generating a dependency model based on the augmented DFMEA data, wherein the dependency model captures causal relationship(s) between the first subsystem failure modes and the second subsystem failure modes, and wherein the causal relationship(s) are identified based on the first augmented DFMEA document and the second augmented DFMEA document;
- the diagnostics association data is received from a first technical specialist at a first computer, and wherein the vehicle operation signals association data is received from a second technical specialist at a second computer;
- the fault diagnosis and analysis includes generating an artificial intelligence (AI) classifier based on the augmented DFMEA data;
- the fault diagnosis and analysis includes executing an AI computer application to diagnose the one or more vehicles based on observed diagnostic data and/or observed vehicle operation signals data pertaining to the one or more vehicles, and wherein the AI computer application is configured to use the AI classifier to diagnose the one or more vehicles;
- sending a message to at least one of the one or more vehicles, wherein the message indicates a particular failure mode of the plurality of failure modes that is identified based on the diagnosis performed using the AI computer application; and/or
- the fault diagnosis and analysis includes determining whether each of the plurality of failure modes are isolatable from one another.

According to another aspect of the invention, there is provided a method of performing fault diagnosis and analysis for one or more vehicles. The method includes: obtaining design failure mode and effect analysis (DFMEA) data, wherein the DFMEA data specifies a plurality of failure modes including first subsystem failure modes and second subsystem failure modes; receiving diagnostic association data, wherein the diagnostic association data specifies, for each of a first set of the plurality of failure modes, one or more diagnostic trouble code(s) (DTC(s)) that are to be associated with the failure mode; receiving vehicle operation signals association data, wherein the vehicle operation signals association data specifies, for each of a second set of the plurality of failure modes, vehicle operation signals data that is to be associated with the failure mode; generating augmented DFMEA data that indicates the DTC(s) that are observable at the one or more vehicles when the one or more vehicles are experiencing any failure mode(s) of the first set of failure modes, and that indicates the vehicle operation signals data that is observable at the one or more vehicles when the one or more vehicles are experiencing any failure mode(s) of the second set of failure modes, wherein the augmented DFMEA data is generated based on the DFMEA data, the diagnostic association data, and the vehicle operation signals association data; generating a dependency model based on the augmented DFMEA data, wherein the dependency model indicates causal relationships between the first subsystem failure modes and the second subsystem failure modes; and performing fault diagnosis and analysis for the one or more vehicles using the augmented DFMEA data.

According to various embodiments, this method may further include any one of the following features or any technically-feasible combination of some or all of these features:
- the fault diagnosis and analysis includes: obtaining observed diagnostic data and observed vehicle operation signals data pertaining to at least one of the one or more vehicles, and identifying a failure mode of the at least one vehicle by comparing the observed diagnostic data to diagnostic data as indicated in the dependency model and by comparing the observed vehicle operation signals data to vehicle operation signals data as indicated in the dependency model;
- wherein a first portion of the diagnostics association data is received from a first technical specialist at a first computer and a second portion of the diagnostics association data is received from a second technical specialist at a second computer; and/or
- a first portion of the vehicle operation signals association data is received from a third technical specialist at a third computer and a second portion of the vehicle operation signals association data is received from a fourth technical specialist at a fourth computer.

According to yet another aspect of the invention, there is provided a vehicle fault diagnosis and analysis system. The vehicle fault diagnosis and analysis system includes: one or more computers each having a processor; and memory storing computer instructions that are executable by the one or more computers, wherein the memory is communicatively coupled to the one or more computers; wherein, when the computer instructions are executed by the one or more computers, the vehicle fault diagnosis and analysis system: (i) obtains augmented design failure mode and effect analysis (DFMEA) data that indicates diagnostic data that is observable at one or more vehicles when the one or more vehicles are experiencing any failure mode(s) of a first set of failure modes, and that indicates vehicle operation signals data that is observable at the one or more vehicles when the one or more vehicles are experiencing any failure mode(s) of a second set of failure modes, wherein the augmented DFMEA data is generated based on DFMEA data, diagnostic association data, and vehicle operation signals association data; and (ii) performs fault diagnosis and analysis for the one or more vehicles using the augmented DFMEA data.

According to various embodiments, this vehicle fault diagnosis and analysis system may further include any one of the following features or any technically-feasible combination of some or all of these features:
- the augmented DFMEA data is generated by a DFMEA augmentation application that is executable by one or more remote computers, wherein, when the DFMEA augmentation application is executed, the one or more remote computers: (a) obtain the DFMEA data, wherein the DFMEA data specifies a plurality of failure modes including the first set of failure modes and the second set of failure modes; (b) receive the diagnostic association data, wherein the diagnostic association data specifies, for each of the first set of failure modes, one or more diagnostic trouble code(s) (DTC(s)) that are to be associated with the failure mode; (c) receive the vehicle operation signals association data, wherein the vehicle operation signals association data specifies, for each of the second set of failure modes, vehicle operation signals data that is to be associated with the failure mode; (d) generate the augmented DFMEA data; and (e) provide the augmented DFMEA data to the one or more computers of the vehicle fault diagnosis and analysis system;
- the one or more remote computers are separate from the one or more computers of the vehicle fault diagnosis and analysis system; and/or
- the vehicle fault diagnosis and analysis system is controlled by an original equipment manufacturer (OEM) of the one or more vehicles, wherein the DFMEA augmentation application is provided by the OEM to a supplier that provides parts to the OEM for the one or more vehicles, and wherein the supplier controls the one or more remote computers.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables fault diagnosis and analysis to be performed for one or more vehicles based on augmented design failure mode and effect analysis (DFMEA) data that is generated. In many embodiments, DFMEA data pertaining to a vehicle subsystem, VSM, or other portions of the vehicle is obtained and then supplemented or augmented with diagnostic data and vehicle operation signals data. The diagnostic database includes information or data pertaining to diagnostics of one or more vehicles, and can include diagnostic trouble codes (DTCs) and/or other diagnostic information, such as various other error or failure data or indicators. The vehicle operation signals data is information or data pertaining to vehicle operation signals, which are electronic signals that are used as a part of normal vehicle operation. In many embodiments, the method includes generating augmented DFMEA data based on diagnostic association data, which provides for (or indicates) an association between certain diagnostic data (e.g., DTC(s)) and failure modes of the DFMEA, and based on vehicle operation signals association data, which provides for (or indicates) an association between certain vehicle operation signals data (e.g., the presence of particular values of vehicle operation signals) and failure modes of the DFMEA. For example, these associations can indicate that certain diagnostic data (e.g., DTC(s)) and/or certain vehicle operation signals indicate the presence of a particular failure mode as specified in the DFMEA data.

As mentioned above, the augmented DFMEA data can be used for performing fault diagnosis and analysis for one or more vehicles. As used herein, the term "fault diagnosis and analysis" includes fault diagnosis, fault analysis, or both. As an example of fault diagnosis, the augmented DFMEA data can be used as a part of an artificial intelligence (AI) computer application that diagnosis one or more vehicles based on diagnostic data received from the vehicle and/or vehicle operation signals data received from the vehicle. The augmented DFMEA data can be used to develop, define, or otherwise generate an AI classifier that is used as a part of the AI computer application. As an example of fault analysis, the augmented DFMEA data can be analyzed or inspected to determine whether each of the failure modes are isolatable from one another based on the diagnostic data and the vehicle operation signals data. For example, if two failure modes of the augmented DFMEA data are indicated by the same combination of diagnostic data and vehicle operation signals data, then the two failures modes are considered to be not isolatable from one another—that is, when the two failure modes have the same diagnostic association data and vehicle operation signals association data, then these two failure modes can be considered non-isolatable. The results of this analysis can be provided as feedback for developing or updating future vehicle subsystems, VSMs, or other vehicle components. Other fault diagnosis and analysis techniques, applications, or implementations can certainly be used, as those provided herein are merely exemplary.

In at least one embodiment, a DFMEA document (or other DFMEA data) may be developed separately for each subsystem of a vehicle and, thus, there may be a plurality of DFMEA documents for a particular vehicle. Each of these DFMEA documents can be augmented using the method below so that the failure modes of the DFMEA document is associated with diagnostic data and/or vehicle operation signals data. Furthermore, once the plurality of augmented DFMEA documents are generated or otherwise obtained, a dependency model can be generated that captures causal relationship(s) between the failure modes of the various subsystems, along with diagnostic data and/or vehicle operation signals data. The dependency model can thus indicate whether certain diagnostic information (e.g., DTC(s)) relating to a first subsystem is indicative of a particular failure mode of a second subsystem where the first subsystem and the second subsystem are a part of the same vehicle, but are different from one another.

For example, in one embodiment, the first subsystem may be a fuel delivery subsystem of the vehicle and the second subsystem may be an air intake subsystem of the vehicle. The DTCs P0171 and P0174 may be first-subsystem DTCs (or, more generally, first subsystem diagnostic data) and can be specified in a first DFMEA document as being indicative of a first failure mode of the first subsystem. The DTCs P0101, P0106, P0171, and P0174 may be second-subsystem DTCs (or, more generally, second subsystem diagnostic data) and can be specified in a second DFMEA document as being indicative of a first failure mode of the second subsystem. A dependency model (or other dependency data) can be generated by merging each of the plurality of augmented DFMEA documents (or other data). The dependency model can thus provide information concerning how a failure mode of a first subsystem may actually be the cause of a failure mode of another subsystem. In the example above, the dependency model can indicate that the combination of DTCs P0101, P0106, P0171, and P0174 indicate the occurrence of the first failure mode of the second subsystem and that the DTCs P0171 and P0174 indicate the occurrence of the first failure mode of the first subsystem. Thus, when the system observes the DTCs P0101, P0106, P0171, and P0174, this may indicate that the failure of the vehicle is due to the second subsystem and not due to a failure of the first subsystem. In some embodiments, without this dependency model, the presence of the DTCs P0171 and P0174 may indicate that there is a problem with the fuel delivery subsystem as the causal link between the first failure mode and the DTCs P0171 and P0174 may not be available or specified in the first subsystem augmented DFMEA document or other data.

Figure 1:
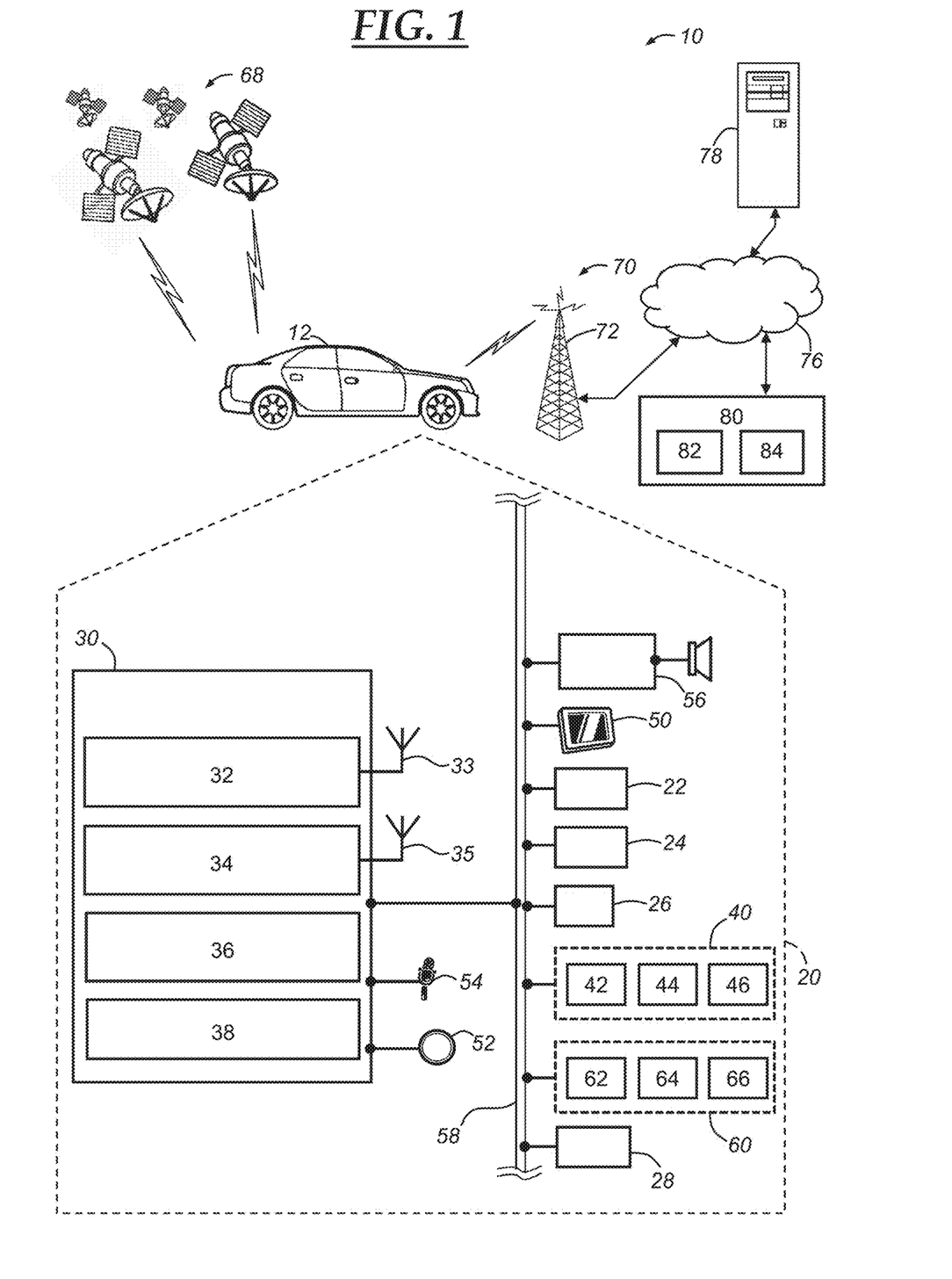
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 with a wireless communications device 30 and other VSMs 22-66, a constellation of global navigation satellite system (GNSS) satellites 68, one or more wireless carrier systems 70, a land communications network 76, one or more remote computers 78, and a vehicle backend services facility 80. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed methods as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station.

If used, this satellite telephony can be utilized either in addition to or in lieu of wireless carrier system 70.

Land network 76 may be a conventional land-based telecommunications network that is connected to one or more landline telephones and connects wireless carrier system 70 to remote computers 78 and vehicle backend services facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Remote computers 78 (only one shown) can be some of a number of computers accessible via a private or public network such as the Internet. In one embodiment, each such remote computer 78 can be used for one or more purposes, such as for receiving diagnostic association data and/or vehicle operation signals association data that can be used to generate augmented DFMEA data. Other such accessible computers 78 can be, for example: a server for providing navigational services to a plurality of vehicles and other electronic network computing devices; a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, backend facility 80, or both. A computer 78 can also be used for providing Internet connectivity such as DNS services or as a network address server that uses DHCP or other suitable protocol to assign an IP address to vehicle 12.

Vehicle backend services facility 80 is a backend facility and is located at a physical location that is located remotely from vehicle 12. The vehicle backend services facility 80 (or "backend facility 80" for short) may be designed to provide the vehicle electronics 20 with a number of different system back-end functions through use of one or more electronic servers 82 and, in some cases, may provide navigation-related services to a plurality of vehicles. The vehicle backend services facility 80 includes vehicle backend services servers 82 and databases 84, which may be stored on a plurality of memory devices. Vehicle backend services facility 80 may include any or all of these various components and, preferably, each of the various components are coupled to one another via a wired or wireless local area network. Backend facility 80 may receive and transmit data via a modem connected to land network 76. Data transmissions may also be conducted by wireless systems, such as IEEE 802.11x, GPRS, and the like. Those skilled in the art will appreciate that, although only one backend facility 80 and one remote computer 78 are depicted in the illustrated embodiment of FIG. 1, numerous remote facilities 80 and/or remote computers 78 may be used. Moreover, a plurality of backend facilities 80 and/or remote computers 78 can be geographically distributed, and can each coordinate information and services with one another, as those skilled in the art will appreciate.

Servers 82 can be computers or other computing devices that include at least one processor and that include memory. The processors can be any type of device capable of processing electronic instructions including, for example, microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. In one embodiment, the servers 82 can carry out a DFMEA augmentation application that can generate or otherwise augment DFMEA data. Additionally or alternatively, the servers 82 can carry out a vehicle fault diagnosis and analysis application, which performs fault diagnosis and analysis for one or more vehicles. The DFMEA augmentation application and the vehicle fault diagnosis and analysis application can be embodied in software, which may be stored in computer-readable memory.

The computer-readable memory can be any suitable computer-readable medium, such as non-transitory, computer-readable memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and/or magnetic or optical disc drives. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Backend facility 80 can include a number of routers, modems, switches, or other network devices that can be used to provide networking capabilities, such as connecting with land network 76 and/or wireless carrier system 70.

Databases 84 can be stored on a plurality of memory, such as a powered temporary memory or any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and/or magnetic or optical disc drives. One or more databases at the backend facility 80 can store various information and can include a DFMEA database, a diagnostic database, a vehicle operation signals database, and other vehicle information database(s).

The DFMEA database can include various information or data pertaining to DFMEA of various subsystems of the vehicle. The DFMEA data can include DFMEA documents or files, which can be embodied in various formats that are consumable or readable by one or more computer applications. In one embodiment, the DFMEA documents or files (referred to collectively as "DFMEA documents") can be Microsoft Excel™ documents, Microsoft Word™ documents, comma separated value (CSV) documents, other delimiter-based documents, etc. The DFMEA database can be a single database, or can be many databases. For example, certain automotive suppliers may provide parts to a vehicle original equipment manufacturer (OEM), and these automotive suppliers can develop and store DFMEA data in their own DFMEA database or memory. This supplier DFMEA data can be provided to the vehicle OEM, which can (in some embodiments) manage or control the backend facility 80.

The diagnostic database includes diagnostic data, which includes information or data pertaining to diagnostics of one or more vehicles, and can include DTCs and/or other diagnostic information, such as various other error or failure data or indicators. The DTCs are diagnostic trouble codes, and can include those codes defined under the Society of Automotive Engineers (SAE) standard J1979 and International Standard Organization (ISO) 15031-5. The diagnostic database can include descriptive information concerning each of the possible DTCs for a particular vehicle or vehicle model, such as a description of what a given DTC indicates when detected at the vehicle. The diagnostic database can also include historical diagnostic data from a plurality of vehicles, such as a fleet of vehicles having a common OEM. The historical diagnostic data can include historical DTC data, which is data that indicates one or more DTCs that were detected at a vehicle. This historical DTC data (or other historical diagnostic data) can be associated with a time indicator (e.g., a timestamp) representing the time of detecting the DTC (or other time associated with the DTC), a location representing the location of detecting the DTC (or other location associated with the DTC), and/or other information. Also, in some embodiments, the diagnostic database can include diagnostic association data that is received or otherwise obtained as a part of embodiments of the method discussed below. In other embodiments, the diagnostic association data can be stored in another database.

The vehicle operation signals database includes vehicle operation signals data, which is information or data pertaining to vehicle operation signals, which are electronic signals that are used as a part of normal vehicle operation. The vehicle operation signals database can include descriptions of a plurality of vehicle operation signals for a particular vehicle or vehicle model, such as a description of what a given vehicle operation signal indicates when detected at the vehicle and/or what a given value (or one or more values (including one or more ranges of values)) of a particular vehicle operation signal indicates. The vehicle operation signals database can also include historical vehicle operation signals data, which is data that indicates one or more vehicle operation signals that were detected at a vehicle. This historical vehicle operation signals data can be associated with a time indicator (e.g., a timestamp) representing the time of detecting the vehicle operation signal (or other time associated with the vehicle operation signal), a location representing the location of detecting the vehicle operation signal (or other location associated with the vehicle operation signal), and/or other information. Also, in some embodiments, the vehicle operation signals database can include vehicle operation signals association data that is received or otherwise obtained as a part of embodiments of the method discussed below. In other embodiments, the vehicle operation signals association data can be stored in another database.

The historical vehicle operation signals data and the historical diagnostic data can be associated with one another based on the time indicators, event indicators (i.e., indicators that identify an event (e.g. a time and location for a particular vehicle)), location indicators, etc. This association can be implemented by cross-referencing historical vehicle operation signals data in the vehicle operation signals database with the historical diagnostic data in the diagnostic database. In other embodiments, the historical vehicle operation signals data and the historical diagnostic data can be included in a single database. Also, those skilled in the art will appreciate that many various structures can be used for the databases 84.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and include a global navigation satellite system (GNSS) receiver 22, body control module or unit (BCM) 24, engine control module (ECM) 26, other vehicle system modules (VSMs) 28, a wireless communications device 30, vehicle-user interfaces 50-56, first subsystem 40, and second subsystem 60. In the illustrated embodiment, the vehicle 12 is an internal combustion engine (ICE) vehicle. However, in other embodiments, the vehicle 12 can be a hybrid (e.g., a plug-in hybrid electric vehicle (PHEV)) or an electric vehicle. Some or all of the different vehicle electronics 20 may be connected for communication with each other via one or more communication buses, such as bus 58. Communications bus 58 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few. In other embodiments, any one or more of the VSMs can communicate using a wireless network and can include suitable hardware, such as short-range wireless communications (SRWC) circuitry. Of course, any suitable combination of these communication techniques can be used as well.

The vehicle 12 can include numerous vehicle system modules (VSMs) as part of vehicle electronics 20, such as the GNSS receiver 22, BCM 24, ECM 26, wireless communications device 30, vehicle-user interfaces 50-56, first subsystem VSMs 42-46, and second subsystem VSMs 62-66, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is connected by communications bus 58 to the other VSMs, as well as to the wireless communications device 30. One or more VSMs 28 may periodically or occasionally have their software or firmware updated and, in some embodiments, such vehicle updates may be over the air (OTA) updates that are received from a computer 78 or backend facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives GNSS signals from a constellation of GNSS satellites 68. The GNSS receiver 22 can be configured to comply with and/or operate according to particular regulations or laws of a given geopolitical region (e.g., country). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 68. And, in another example, GNSS receiver 22 can be a BDS receiver that receives a plurality of GNSS (or BDS) signals from a constellation of GNSS (or BDS) satellites 68. In either implementation, GNSS receiver 22 can include at least one processor and memory, including a non-transitory computer readable memory storing instructions (software) that are accessible by the processor for carrying out the processing performed by the receiver 22. The GNSS receiver 22 can be used to obtain a location of the vehicle, such as a geographic coordinate location.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to communication bus 58. In some embodiments, the BCM 24 may be integrated with or part of a center stack module (CSM) and/or integrated with the wireless communications device 30. Or, the BCM 24 may be a separate device that is connected to other VSMs via bus 58. The BCM 24 can include a processor and/or memory, which can be similar to processor 36 and memory 38 of the wireless communications device 30, as discussed below. The BCM 24 may communicate with the wireless communications device 30 and/or one or more vehicle system modules, such as the first subsystem VSMs 42-46, the second subsystem VSMs 62-66, audio system 56, or other VSMs 28. The BCM 24 may include a processor and memory accessible by the processor. Suitable memory may include non-transitory computer-readable memory that includes various forms of non-volatile RAM and ROM. Software stored in the memory and executable by the processor enables the BCM to direct one or more vehicle functions or operations including, for example, controlling central locking, air conditioning (or other HVAC functions), power mirrors, controlling the vehicle primary mover (e.g., engine, primary propulsion system), and/or controlling various other vehicle modules. For example, the BCM 24 can send signals to other VSMs, such as a request to perform a particular operation or a request for sensor information and, in response, the sensor may then send back the requested information.

Additionally, the BCM 24 may provide vehicle state information corresponding to the vehicle state or of certain vehicle components or subsystems, including the VSMs discussed herein. For example, the BCM 24 may provide the wireless communication device 30 with information indicating whether the vehicle's primary propulsion system is engaged or in an active (or ready) state (or when the ignition is turned on as received from an engine control module in an ICE vehicle), diagnostic data (e.g., DTC(s)), vehicle operation signals, and/or other information regarding the vehicle. The information can be sent to the wireless communications device 30 (or other central vehicle computer) automatically upon receiving a request from the device/computer, automatically upon certain conditions being met, or periodically (e.g., at set time intervals). In one embodiment, the vehicle state information includes vehicle operation signals and/or diagnostic data (e.g., DTC(s)), which can be detected by the BCM 24 (or other VSM) and then sent to the backend facility 80 using the wireless communications device 30, for example. This vehicle state information can then be stored in databases 84 and used as a part of the method discussed below, at least in some embodiments. The vehicle operation signals are communicated over the communication bus 58 as a part of the normal operation of the vehicle. The BCM 24 (or other VSM) can detect and record the presence of vehicle operation signals that are being sent over the communication bus 58.

Also, in some embodiments, in addition to recording the presence of the vehicle operation signal, other information pertaining to or that is a part of the vehicle operation signal can be recorded, such as one or more numerical values sent as a part or along with the vehicle operation signal. The vehicle operation signals data that is recorded at the vehicle can include information pertaining to one or more vehicle operation signals, such as the presence of the vehicle operation signal, one or more values being conveyed by (or otherwise associated with) the vehicle operation signal, and/or other information pertaining to the vehicle operation signal. The diagnostic data that is recorded at the vehicle can include information pertaining to one or more diagnostic signals, such as the presence of the diagnostic signal (e.g., the presence of a DTC), one or more values being conveyed by (or otherwise associated with) the diagnostic signal, and/or other information pertaining to the diagnostic signal. Also, a vehicle location (e.g., as determined using the GNSS receiver 22) and/or a time indicator can be recorded along with the vehicle operation signals data and/or the diagnostic data, and/or sent to the backend facility 80.

As mentioned above, in the illustrated embodiment, the vehicle 12 includes an internal combustion engine (ICE) and is referred to as an ICE vehicle. ICE vehicles may solely use an ICE for propulsion or may use a combination of another energy generator or store (such as a battery) and the ICE. In the case of an ICE vehicle, the vehicle can include an engine control module (ECM) 26 that controls various aspects of engine operation such as fuel injection and ignition timing. The ECM 26 can be connected to communications bus 58 and may receive operation instructions from BCM 24 or other vehicle system modules, such as the wireless communications device 30 or VSMs 28. In one scenario, the ECU may receive a command from the BCM 24 to initiate the ICE. The ECM 26 can also be used to obtain sensor information of the vehicle engine.

The engine control module (ECM) 26 may control various aspects of engine operation such as fuel injection and ignition timing. The ECM 26 is connected to the communications bus 58 and may receive operation instructions (or vehicle commands) from the BCM 24 or other vehicle system modules. In one scenario, the ECM 26 may receive a command from the BCM 24 (or other VSM) to place the vehicle in a primary propulsion on state (from a primary propulsion off state)—i.e., initiate the vehicle ignition or other primary propulsion system (e.g., a battery powered motor). In at least some embodiments when the vehicle is a hybrid or electric vehicle, a primary propulsion control module can be used instead of (or in addition to) the ECM 26, and this primary propulsion control module can be used to obtain status information regarding the primary mover (including electrical motor(s) and battery information). A primary propulsion off state refers to a state in which the primary propulsion system of the vehicle is off, such as when the internal combustion engine is not running or idling, when a vehicle key is not turned to a START or ON (or accessory) position, or when the power control system for one or more electric motors of an electric vehicle is powered off or not enabled. A primary propulsion on state is a state that is not a primary propulsion off state.

The vehicle 12 includes various onboard vehicle sensors, including cameras, parking sensors, lane change and/or blind spot sensors, lane assist sensors, ranging sensors (i.e., sensors used to detect the range between the vehicle and another object, such as through use of radar or lidar), other radars, other lidars, tire-pressure sensors, fluid level sensors (including a fuel level sensor), brake pad wear sensors, V2V communication unit (which may be integrated into the wireless communications device 30), rain or precipitation sensors (e.g., infrared light sensor(s) directed toward the windshield (or other window of the vehicle 12) to detect rain or other precipitation based on the amount of reflected light), and interior or exterior temperature sensors. Generally, the sensors can obtain information pertaining to either the operating state of the vehicle (the "vehicle operating state") or the environment of the vehicle (the "vehicle environmental state"). The sensor information can be sent to other VSMs, such as BCM 24 and the vehicle communications device 30, via communications bus 58. Also, in some embodiments, the sensor data can be sent with metadata, which can include data identifying the sensor (or type of sensor) that captured the sensor data, a timestamp (or other time indicator), and/or other data that pertains to the sensor data, but that does not make up the sensor data itself. The "vehicle operating state" refers to a state of the vehicle concerning the operation of the vehicle, which can include the operation of the primary mover (e.g., a vehicle engine, vehicle propulsion motors). Additionally, the vehicle operating state can include information concerning mechanical operations of the vehicle or electrical states of the vehicle, including information pertaining to vehicle operation signals and/or diagnostic data or signals (e.g., DTC(s)). The "vehicle environmental state" refers to a vehicle state concerning the interior of the cabin and the nearby, exterior area surrounding the vehicle. The vehicle environmental state includes behavior of a driver, operator, or passenger, as well as traffic conditions, roadway conditions and features, and statuses of areas nearby the vehicle.

The first subsystem 40 and the second subsystem 60 are each vehicle subsystems having a plurality of VSMs—in other embodiments, the subsystem(s) can each have a single VSM. As used herein, a vehicle subsystem comprises one or more vehicle system modules (VSMs) installed as a part of the vehicle and that operate together to carry out a particular group of related vehicle functions. The first subsystem 40 and the second subsystem 60 can be any of a variety of vehicle subsystems, including (for example) a fuel delivery subsystem, an air intake subsystem, an electrical subsystem, a braking subsystem, a climate control subsystem, an entertainment subsystem, etc. The first subsystem VSMs 42-46 are each a VSM that is considered as a part of the first subsystem 40, and the second subsystem VSMs 62-66 are each a VSM that is considered as a part of the second subsystem 60.

Wireless communications device 30 is capable of communicating data via short-range wireless communications (SRWC) and/or via cellular network communications through use of a cellular chipset 34, as depicted in the illustrated embodiment. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a head unit, and/or a gateway module. In some embodiments, the device 30 can be implemented as an OEM-installed (embedded) or aftermarket device that is installed in the vehicle. In some embodiments, the wireless communications device 30 is a telematics unit (or telematics control unit) that is capable of carrying out cellular communications using one or more wireless carrier systems 70. The telematics unit can be integrated with the GNSS receiver 22 so that, for example, the GNSS receiver 22 and the wireless communications device (or telematics unit) 30 are directly connected to one another as opposed to being connected via communications bus 58.

In some embodiments, the wireless communications device 30 can be configured to communicate wirelessly according to one or more short-range wireless communications (SRWC) such as any of the Wi-Fi™, WiMAX™, Wi-Fi Direct™, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, Bluetooth™ 5.1, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device. Additionally, in some embodiments including the illustrated embodiment, the wireless communications device 30 includes the cellular chipset 34 thereby allowing the device to communicate via one or more cellular protocols, such as those used by cellular carrier system 70. In such a case, the wireless communications device becomes user equipment (UE) usable in carrying out cellular communications via cellular carrier system 70.

The wireless communications device 30 may enable the vehicle 12 to be in communication with one or more remote networks (e.g., one or more networks at backend facility 80 or remote computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the wireless communications device 30. The device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. The memory 38 may be a temporary powered memory, any non-transitory computer-readable medium, or other type of memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and/or magnetic or optical disc drives. Similar components to those previously described (processor 36 and/or memory 38, as well as SRWC circuit 32 and cellular chipset 34) can be included in body control module 24, the ECM 26, the first subsystem 40 (e.g., as a part of one or more of the first subsystem VSMs 42-46), the second subsystem 60 (e.g., as a part of one or more of the second subsystem VSMs 62-66), and/or various other VSMs that typically include such processing/storing capabilities. The wireless communications device 30 is connected to the bus 58, and can receive DTC(s) (or other diagnostic data) and/or vehicle operation signals that are sent over the communications bus 58. The vehicle can send this data (or other data derived from or based on this data) to other devices or networks, including the backend facility 80.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 56 provides audio output to a vehicle occupant and can be a dedicated, stand-alone system or part of the primary vehicle audio system. According to the particular embodiment shown here, audio system 56 is operatively coupled to both the communication bus 58 and an entertainment bus (not shown), and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Various other vehicle-user interfaces can also be utilized, as the interfaces of FIG. 1 are only an example of one particular implementation.

Figure 2:
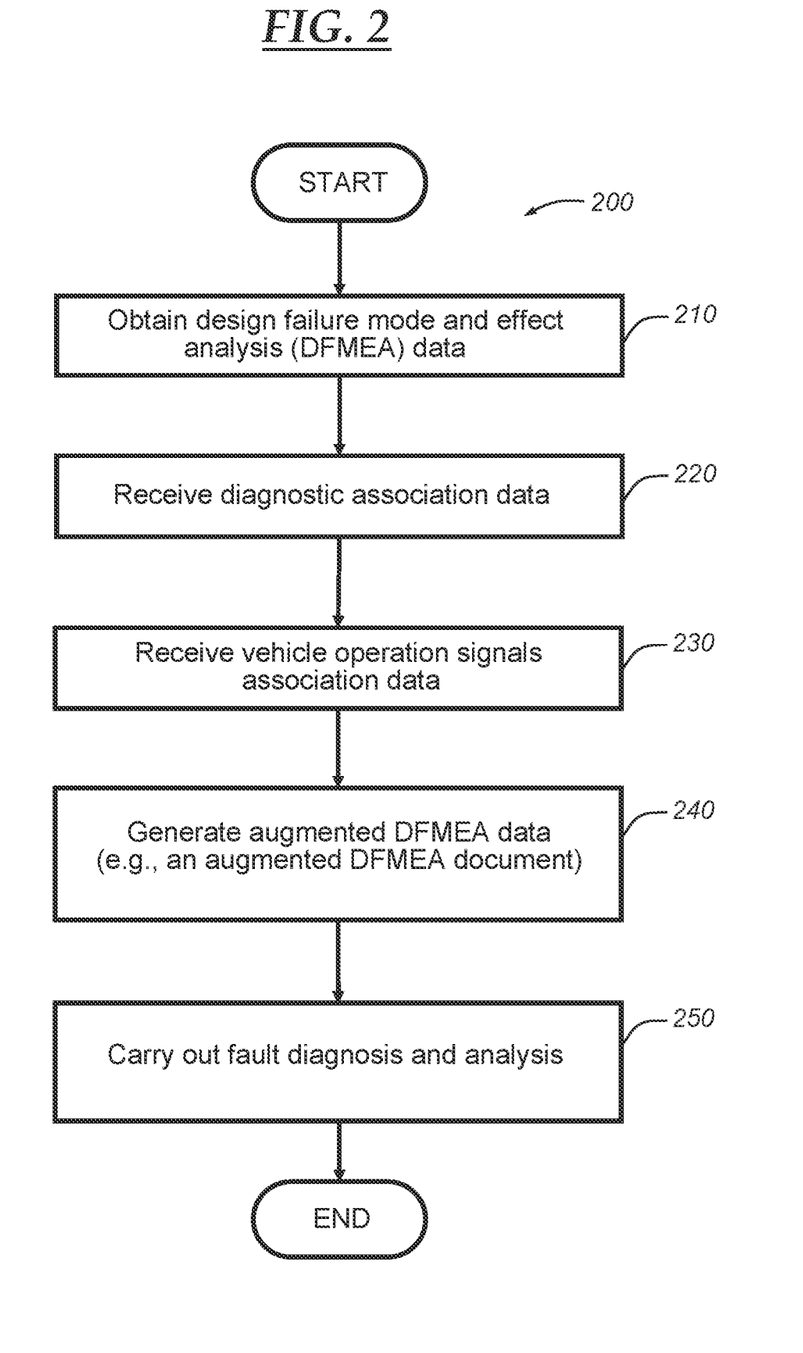
FIG. 2 is a flowchart of an embodiment of a method of performing fault diagnosis and analysis for one or more vehicles.

With reference to FIG. 2, there is shown an embodiment of a method 200 of performing fault diagnosis and analysis for one or more vehicles. The method 200 can be carried out by the backend facility 80 using one or more servers 82 and, in at least some embodiments, can be carried out using a plurality of servers. In another embodiment, the method 200 can be carried out at one or more remote computers 78. In other embodiments, the method 200 can be carried out by a combination of the servers 82 of the backend facility 80 and the one or more remote computers 78. In one embodiment, the steps 210-240 of the method 200 are carried out by the DFMEA augmentation application, and the step 250 of the method 200 is carried out by the vehicle fault diagnosis and analysis application. Although the DFMEA augmentation application and the vehicle fault diagnosis and analysis application are each referred to or discussed as a single application in the following description, these applications can each be comprised of one or more computer applications that are carried out on one or more computers, any one or more of which can be a part of the backend facility 80 (or other backend facility) and/or the remote computers 78. The steps of the method 200 can be carried out according to any technically feasible order, as appreciated by those skilled in the art.

The method 200 begins with step 210, wherein design failure mode and effect analysis (DFMEA) data is obtained. The DFMEA data is generated as a part of the design, manufacturing, and/or initial testing of a vehicle, one or more subsystems of the vehicle, and/or one or more VSMs or other components of the vehicle. The DFMEA data can be embodied in computer-readable data and/or in one or more DFMEA documents. The DFMEA data specifies a plurality of failure modes and can include descriptions of each of the plurality of failure modes. Also, in some embodiments, the DFMEA data can include symptom data for each of the failure modes. The symptom data is data that describes or indicates one or more symptoms of the vehicle as a result of (or indicative of) a particular failure mode. The DFMEA data can also include a part identifier for each failure mode. The part identifier is information that identifies a part or an interface of the vehicle that is deemed to be associated with the particular failure mode, such as a part or an interface that is considered as failing as a part of the failure mode.

In one embodiment, the DFMEA data is DFMEA information for a particular subsystem of the vehicle. Additionally or alternatively, the DFMEA data is DFMEA information for a plurality of subsystems of the vehicle. For example, a first DFMEA document (or data) for the first subsystem 40 can be generated, a second DFMEA document (or data) for the second subsystem 60 can be generated, and then the first DFMEA document and the second DFMEA document (or data) can be combined with one another to obtain a multi-subsystem DFMEA document (or data). Also, the DFMEA data can include the first DFMEA data (e.g., the first DFMEA document) and/or the second DFMEA data (e.g., the second DFMEA document). In one embodiment, the DFMEA data can be inputted by a technical specialist into a computer system, such as a computer connected to or that is a part of the backend facility 80. The DFMEA data can be inputted into the computer system at a time of manufacturing the vehicle, or the portion of the vehicle to which it relates (e.g., the first subsystem, the second subsystem).

In some embodiments, as a part of obtaining the DFMEA data, the DFMEA data can be recalled from a database, such as from the DFMEA database of the databases 84, or from other memory, such as the memory of one or more of the remote computers 78 or servers 82. This obtaining step can also include providing the DFMEA data to a first technical specialist, which can include presenting the DFMEA data to one or more technical specialists using a computer, such as the remote computer 78, servers 82, or other remote computer. As mentioned above, the DFMEA data can be embodied in one or more DFMEA documents. These DFMEA documents can be presented or otherwise provided to the one or more technical specialists using a computer application that is suited for or capable of interpreting or reading the DFMEA document(s), such as, for example, Microsoft Excel™ in the case that the DFMEA document(s) are CSV files, Excel™ files (e.g., "xls", "xlsx"), or other file readable by Microsoft Excel™. The method 200 then continues to step 220.

In steps 220 and 230, diagnostic association data and vehicle operation signals association data is received at one or more computers, such as at one or more remote computers (e.g., remote computer(s) 78). This received diagnostic association data indicates diagnostic data or indicators (e.g., DTC(s)) to be associated with the DFMEA data that was obtained in step 210. This received vehicle operation signals association data indicates vehicle operation signals data to be associated with the DFMEA data that was obtained in step 210. These steps can be carried out at different locations, such as at a first remote computer (for step 220) and a second remote computer (for step 230). Although step 230 is illustrated and discussed below as being carried out after step 220, in other embodiments, step 220 and step 230 can be carried out at the same time, or step 230 may be carried out prior to step 220. After steps 220 and 230 are carried out, in step 240, augmented DFMEA data (e.g., an augmented DFMEA document) is generated based on (or as a result of receiving) the received diagnostic association data and vehicle operation signals association data.

In step 220, diagnostic association data is received and, in many embodiments, DTC data (an example of diagnostic data) is received. The diagnostic association data includes one or more identifiers or indicators that identify or indicate one or more diagnostic signals (e.g., DTC(s)) (or other diagnostic data) that each are associated with (or are to be associated with) a failure mode of the plurality of failure modes specified in the DFMEA data. It should be appreciated that, in some scenarios, there may not be diagnostic data (or a DTC) associated with one or more of the failure modes of the DFMEA data and, in such a case, no diagnostic association data is received for that failure mode. The failure modes that are associated with diagnostic data based on the diagnostic association data can be referred to as a first set of failure modes, which can include one or more failure modes of the plurality of failure modes in the DFMEA data. The DTC(s) can be input into a computer by a first technical specialist, such as a hardware technical specialist. The first technical specialist can be a specialist with respect to a particular subsystem, VSM, or other portion of the vehicle to which the DFMEA data pertains. In at least some embodiments, the DFMEA data is presented to the first technical specialist at a first computer (e.g., a first one of the remote computers 78), and the first technical specialist then can view the DFMEA data and provide diagnostic association data (e.g., DTC(s), a selection or indication of one or more DTCs or other diagnostic data) that is associated with each of the failure modes presented as a part of the DFMEA data. For example, in one embodiment, the first technical specialist can be provided with a DFMEA document that describes a plurality of failure modes with each failure mode being presented within its own row of a table or spreadsheet (e.g., an Excel™ spreadsheet). In such an example, the first technical specialist can then insert or otherwise provide diagnostic association data (e.g., DTC(s), other diagnostic indicators) in a new column and can fill in each cell of this new column based on the failure mode in the row that contains the cell. In some embodiments, the DFMEA augmentation application can be used for this step and can include a graphical user interface (GUI) that facilitates entry or input of the diagnostic association data. The first technical specialist can provide the diagnostic association data by typing on a keyboard that is communicatively coupled to the first computer. Other input means can be used as well, such as by selecting a DTC from a list of DTCs using a mouse. The method 200 continues to step 230.

In step 230, vehicle operation signals association data is received. The vehicle operation signals association data is one or more identifiers or indicators that identify or indicate one or more vehicle operation signals (or other vehicle operation signals data) that each are associated with (or are to be associated with) a failure mode of the plurality of failure modes specified in the DFMEA data. It should be appreciated that, in some scenarios, there may not be a vehicle operation signal (or other vehicle operation signals data) associated with one or more of the failure modes of the DFMEA data and, in such a case, no vehicle operation signals association data is received for that failure mode. The failure modes that are associated with vehicle operation signals data based on the vehicle operation signals association data can be referred to as a second set of failure modes, which can include one or more failure modes of the plurality of failure modes in the DFMEA data. The vehicle operation signals association data can be input into a computer by a second technical specialist, such as a signals or controls technical specialist. In one embodiment, the second technical specialist can be the same individual as the first technical specialist; however, in other embodiments, the first technical specialist and the second technical specialist are different technical specialists. The second technical specialist can be a specialist with respect to a particular subsystem, VSM, or other portion of the vehicle to which the DFMEA data describes or is otherwise associated with. In at least some embodiments, the DFMEA data is presented to the second technical specialist at a second computer (e.g., a second one of the remote computers 78), and the second technical specialist then can view the DFMEA data and provide vehicle operation signals association data for each of the failure modes presented as a part of the DFMEA data. For example, in one embodiment, the second technical specialist can be provided with a DFMEA document that describes a plurality of failure modes with each failure mode being presented within its own row. This DFMEA document can be the same DFMEA document that was provided to the first technical specialist in step 220. In such an example, the second technical specialist can then insert or otherwise provide vehicle operations signal association data in a new column and can fill in each cell of this new column based on the failure mode in the row that contains the cell. In some embodiments, the DFMEA augmentation application can be used for this step and can include a GUI that facilitates entry or input of the vehicle operation signals association data.

The second technical specialist can provide the vehicle operation signals association data by typing on a keyboard that is communicatively coupled to the second computer. Other input means can be used as well, such as by selecting a vehicle operation signal from a list of vehicle operation signals using a mouse. The method 200 continues to step 240.

In step 240, augmented DFMEA data is generated based on the diagnostic association data and the vehicle operation signals association data. In at least some embodiments, the augmented DFMEA data provides a causal relationship between diagnostic data (e.g., DTC(s)) and one or more failure modes of the DFMEA data, and this causal relationship can be indicated by (or based on) the diagnostic association data. Also, in at least some embodiments, the augmented DFMEA data provides a causal relationship between vehicle operation signals data (e.g., information concerning one or more electronic signals used as a part of operation of the vehicle) and one or more failure modes of the DFMEA data, and this causal relationship can be indicated by (or based on) the vehicle operation signals association data. The augmented DFMEA data can include the diagnostic association data and the vehicle operation signals association data, or other information that associates certain DTC(s) (or other diagnostic data) and certain vehicle operation signals (or other vehicle operation signals data) with each of the failure modes, for example. However, as mentioned above, some failure modes may not be associated with any particular diagnostic data and/or vehicle operation signals data and, in such cases, the DFMEA data for these failure modes may not be augmented with the diagnostic association data, the vehicle operation signals association data, and/or data derived therefrom.

In one embodiment, the augmented DFMEA data includes one or more augmented DFMEA documents. The augmented DFMEA document(s) can be of a particular format or file type. In some embodiments, the augmented DFMEA document(s) are a modified version of one or more DFMEA documents with the modifications being that the diagnostic association data and the vehicle operation signals association data is included. For example, in an embodiment where the DFMEA document for a first subsystem is a spreadsheet having rows for each failure mode, an augmented DFMEA document can be generated by inserting new columns into the DFMEA document with a first column being for the diagnostic association data and a second column being for the vehicle operation signals association data. The augmented DFMEA data can be stored at a database, such as any one or more of those databases 84 (e.g., in the DFMEA database). The method 200 continues to step 250.

In step 250, fault diagnosis and analysis is carried out using the augmented DFMEA data. The fault diagnosis and analysis includes fault diagnosis for one or more vehicles, fault analysis for one or more vehicles, or both. The fault diagnosis can include providing the augmented DFMEA data to a vehicle service facility or technician (or other individual) that is attempting to diagnose problems of one or more vehicles. In another embodiment, the augmented DFMEA data can be used to automatically (or programmatically) monitor and/or diagnose one or more vehicles for various problems. In such embodiments, for example, the augmented DFMEA data can be used by the backend facility 80 to analyze vehicle state information received from one or more vehicles. As an example, the backend facility 80 can identify (based on the vehicle state information or other information received from the vehicle) one or more DTCs and/or vehicle operation signals that were detected at the vehicle. The backend facility 80 can then parse or query the augmented DFMEA data to identify a failure mode that is associated with these one or more DTCs and/or vehicle operation signals. A message can then be generated at the backend facility 80 and sent to the vehicle or other client device, such as a smartphone or other personal mobile device. The message can indicate the identified failure mode and can be presented to a vehicle user or service technician using one or more vehicle-user interfaces, such as display 50.

Additionally or alternatively, fault analysis can be carried out using the augmented DFMEA data. The fault analysis can include analyzing the augmented DFMEA data to identify causal relationships between certain failure modes (and/or their symptoms), DTC(s), and vehicle operation signal(s), as well as between the VSM(s) and/or subsystem(s) related to the failure modes, DTC(s) (or other diagnostic data), and vehicle operation signal(s) (or other vehicle operation signals data). In one embodiment, a machine learning (ML) or artificial intelligence (AI) technique can be applied to historical diagnostic data and/or historical vehicle operation signals data based on (or using) the augmented DFMEA data. Also, in at least some embodiments, the historical diagnostic data and the historical vehicle operation signals data can be used to train the AI classifier so that when real-time data is presented to the AI computer application, the AI classifier can help, assist, or otherwise be used to identify the failure mode. In such an embodiment, an AI classifier can be developed and/or designed based on the causal relationships identified in or determined based on the augmented DFMEA data. The AI classifier can then be used by an AI computer application or network to diagnose problems of one or more vehicles based on historical diagnostic data and/or historical vehicle operation signals data stored in databases 84. The identification of the causal relationships and the development of the AI classifier is an example of fault analysis, and the diagnosis using the AI computer application is an example of fault diagnosis. The AI computer application can also be operated using real-time data from the one or more vehicles—that is, diagnostic data and/or vehicle operation signals data can be detected and sent to the backend facility 80 in real-time and, then, the backend facility 80 can execute the AI computer application using this real-time diagnostic data and/or vehicle operation signals data. The real-time diagnostic data and the real-time vehicle operation signals data is considered a type of historical diagnostic data and historical vehicle operation signals data, respectively. As used herein, diagnostic data that is detected or otherwise observed at a particular vehicle as a part of the particular vehicle's operation is referred to as observed diagnostic data, and vehicle operation signals data that is detected or otherwise observed at a particular vehicle as a part of the particular vehicle's operation is referred to as observed vehicle operation signals data. This observed diagnostic data and observed vehicle operation signals data can be stored as historical diagnostic data and historical vehicle operation signals data in databases. However, it should be appreciated that, in at least some embodiments, not all observed diagnostic data and observed vehicle operation signals data is stored as historical diagnostic data and historical vehicle operation signals data.

As another example of fault analysis, the augmented DFMEA data can be analyzed or inspected to determine whether each failure mode is isolatable or distinguishable from the other failure modes. A first failure mode is isolatable or distinguishable from a second failure mode when the vehicle operation signals and the DTC(s) (or other diagnostic data) associated with the first failure mode are different than the vehicle operation signals and the DTC(s) (or other diagnostic data) associated with the second failure mode. When two failure modes include the same diagnostic association data (or are associated with the same DTC(s) or other diagnostic data) and the same vehicle operation signals association data (or are associated with the same vehicle operation signals data), then a single failure mode cannot be determined (at least from this information alone) and, thus, such failure modes are considered not isolatable. As mentioned above, the vehicle operation signals data can indicate a presence of a particular signal and, in at least some embodiments, can also indicate a value or other information that is conveyed by (or otherwise associated with) the vehicle operation signals data. Thus, in at least some embodiments, when comparing the vehicle operation signals association data, the comparison can include comparing both the presence of a particular vehicle operation signal as well as the values or other information that is conveyed by (or otherwise associated with) the vehicle operation signals data. Thus, by analyzing the augmented DFMEA data, two or more failure modes can be identified that are not isolatable. These identified failure modes can then be provided to a technical specialist or other individual who can then use this information as design feedback and/or to improve the vehicle or vehicle models associated with these non-isolatable failure modes.

In some embodiments, the steps 210-240 can be carried out by a supplier of a vehicle OEM of the one or more vehicles. In such embodiments, for example, the DFMEA augmentation application can be provided to the supplier, which can then use this application to generate the augmented DFMEA data. The supplier can then provide the augmented DFMEA data to the OEM so that it can be used for fault diagnosis and analysis. In some scenarios, the DFMEA data of a particular component, VSM, or subsystem may be considered confidential by the manufacturer or designer (e.g., a supplier) and, in such cases, the manufacturer or designer may not want to provide this DFMEA data to another entity (e.g., an OEM). Thus, in such a scenario, for example, it may be desirable for the OEM to provide the DFMEA augmentation application to the supplier and then the supplier can use the DFMEA augmentation application to generate the augmented DFMEA data. The supplier can then identify causal relationships between one or more failure modes, subsystems, and/or VSMs based on the diagnostic association data and/or the vehicle operation signals data, and these identified causal relationships can be represented by causal relationship data. This causal relationship data can then be provided to the OEM while still maintaining secrecy or confidentiality for portions of the augmented DFMEA data, such as the DFMEA data that was originally developed and deemed confidential.

In one embodiment, a first supplier can generate first augmented DFMEA data for a first subsystem used by a vehicle that is (or includes VSMs that are) developed by the first supplier, and a second supplier can generate second augmented DFMEA data for a second subsystem used by the vehicle that is (or includes VSMs that are) developed by the second supplier. The first augmented DFMEA data and the second augmented DFMEA data can then be analyzed to develop a dependency model, which can provide for identifying causal relationships between the first and second subsystems.

Figure 3:
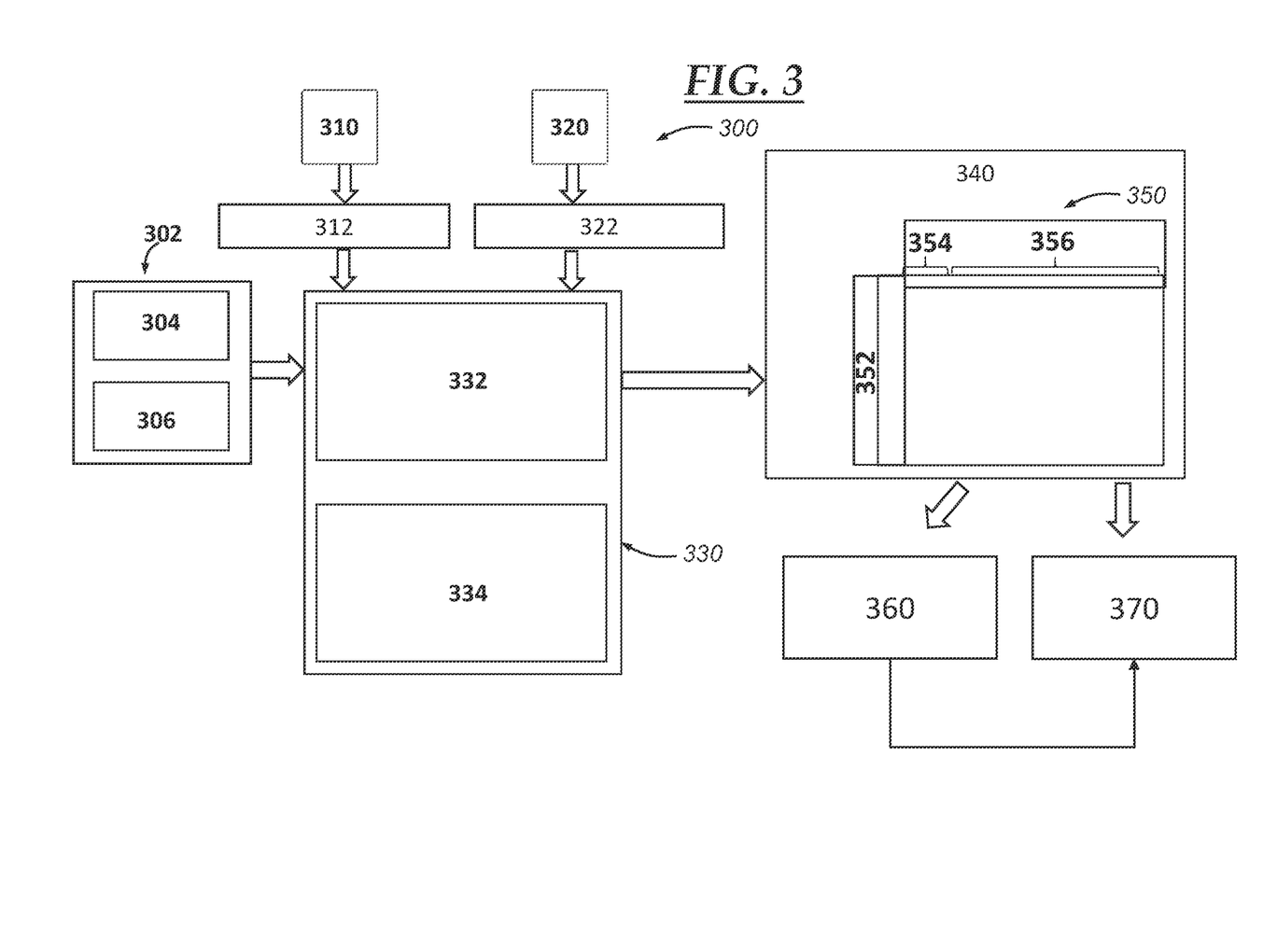
FIG. 3 is a flowchart of another embodiment of a method of performing fault diagnosis and analysis for one or more vehicles.

With reference to FIG. 3, there is shown another embodiment of a method 300 of performing fault diagnosis and analysis for one or more vehicles. The method 300 includes steps that are similar to those of the method 200 (FIG. 2) discussed above, and such discussion is incorporated herein to the extent it does not conflict with the below discussion. Also, any other discussion of the method 200 is incorporated herein with respect to the method 300 to the extent it does not conflict with the below discussion. The steps of the method 300 can be carried out according to any technically feasible order, as appreciated by those skilled in the art.

The method 300 is described below with respect to an exemplary scenario in which the first subsystem 40 is an air intake subsystem of a vehicle and the second subsystem 60 is a fuel delivery subsystem of a vehicle. The method 300 begins with step 302, wherein design failure mode and effect analysis (DFMEA) data is obtained. The DFMEA data is indicated at 302 in FIG. 3 and, in this example, includes a first DFMEA document 304 and a second DFMEA document 306. The first DFMEA document 304 is indicative of a first failure mode of the first subsystem and, in this example, the first failure mode of the first subsystem is an induction system leak in which the air is not suitably provided to the engine. The second DFMEA document 306 is indicative of a first failure mode of the second subsystem and, in this example, the first failure mode of the second subsystem is indicative of an injector being choked or plugged in which fuel is not suitably delivered to the combustion chamber of the engine. In at least some embodiments, the first DFMEA document 304 does not include DFMEA data concerning the second subsystem, and/or the second DFMEA document 306 does not include DFMEA data concerning the first subsystem. Also, in one embodiment, the first DFMEA document 304 includes DFMEA data that only concerns the first subsystem (and not other subsystems), and the second DFMEA document 306 includes DFMEA data that only concerns the second subsystem (and not other subsystems).

In step 312, diagnostic association data for a first set of the plurality of failure modes is received and, in many embodiments, DTC data (an example of diagnostic data) is received. As shown in FIG. 3, this diagnostic association data is received from a first technical specialist 310. This diagnostic association data concerns at least one of the first failure mode of the first subsystem and/or the first failure mode of the second subsystem. In step 322, vehicle operation signals association data is received for a second set of the plurality of failure modes. As shown in FIG. 3, this vehicle operation signals association data is received from a second technical specialist 320. This vehicle operation signals association data concerns at least one of the first failure mode of the first subsystem and/or the first failure mode of the second subsystem. The first technical specialist can be a hardware specialist or other specialist that has knowledge concerning the diagnostics of the vehicle, including the first and/or second subsystems. The second technical specialist can be a software or signals specialist (or other specialist) that has knowledge concerning the vehicle operation signals of the vehicle, including those of used by the first and/or second subsystems. In one embodiment, a first technical specialist can provide diagnostic association data for the first subsystem, a second technical specialist can provide vehicle operation signals association data for the first subsystem, a third technical specialist can provide diagnostic association data for the second subsystem, and a fourth technical specialist can provide vehicle operation signals association data for the second subsystem. The diagnostic association data and the vehicle operation signals association data can be used to generate augmented DFMEA data 330.

In one embodiment, the augmented DFMEA data 330 includes a first augmented DFMEA document 332 that includes augmented DFMEA data for the first subsystem, and a second augmented DFMEA document 334 that includes augmented DFMEA data for the second subsystem. According to some embodiments, the first augmented DFMEA document (or data) indicates the causal relationship between the diagnostic data and a third set of failure modes, and/or the first augmented DFMEA document indicates the causal relationship between the vehicle operation signals data and a fourth set of failure modes. The third set of failure modes are those failure modes that are a part of the first set of failure modes and the first subsystem failure modes (i.e., the failure modes specified in the DFMEA data for the first subsystem), and the fourth set of failure modes are those failure modes that are a part of the second set of failure modes and the first subsystem failure modes. Also, according to some embodiments, the second augmented DFMEA document (or data) indicates the causal relationship between the diagnostic data and a fifth set of failure modes, and/or the second augmented DFMEA document indicates the causal relationship between the vehicle operation signals data and a sixth set of failure modes. The fifth set of failure modes are those failure modes that are a part of the first set of failure modes and the second subsystem failure modes (i.e., the failure modes specified in the DFMEA data for the second subsystem), and the sixth set of failure modes are those failure modes that are a part of the second set of failure modes and the second subsystem failure modes. Any of the sets of failure modes (e.g., the first set, the second set, the third set, the fourth set, the fifth set, the sixth set) can include one or more failure modes or a plurality of failure modes. The method 300 continues to step 340.

In step 340, a dependency model can be generated based on the augmented DFMEA data that captures causal relationship(s) between the failure modes of the various subsystems, and which can be identified based on the diagnostic association data and/or vehicle operation signals association data. The dependency model 350 of FIG. 3 thus includes interrelationships between failure modes 352 of the first subsystem and the second subsystem, and the diagnostic association data 354 and the vehicle operations association data 356. For example, the dependency model 350 can include rows for each of the failure modes 352 (including the first subsystem failure modes and the second subsystem failure modes), a first set of columns for the diagnostic association data 354, and a second set of columns for the vehicle operations association data 356. In each cell, which corresponds to either a diagnostic data/failure mode pair or a vehicle operation signals data/failure mode pair, an indicator (e.g., an "X", a numerical value) can be used to indicate whether there is a causal relationship between the diagnostic data and the failure mode, or between the vehicle operation signals data and the failure mode. In one embodiment, the indicator can be binary (e.g., an "X" to indicate a relationship exists, no entry to indicate no relationship exists), or can include a value (e.g., a numerical value) or other indicator (e.g., a designated level) that indicates the degree or strength of the relationship between the diagnostic data and the failure mode, or between the vehicle operation signals data and the failure mode. In some embodiments, the strength of the correlation and the value (or other data being conveyed by the signal) can be used to indicate a particular failure. Moreover, in some embodiments, the value (or degree of other data being conveyed by the signal) can be used to indicate the probability or confidence that a particular failure mode is present.

This step 340 can include extracting information concerning the first subsystem from the first augmented DFMEA document (or data) and information concerning the second subsystem from the second augmented DFMEA document (or data). In one embodiment, the first augmented DFMEA document (or data) may indicate that the first failure mode of the first subsystem can be associated with the DTCs P0101, P0106, P0171, and P0174. The second augmented DFMEA document (or data) may indicate that the first failure mode of the second subsystem can be associated with the DTCs P0171 and P0174. Thus, by combining the first augmented DFMEA data with the second augmented DFMEA data, the dependency model can indicate that, when the DTCs P0171 and P0174 are detected at a vehicle, the air induction system should be inspected by, for example, determining whether the DTCs P0101 and/or P0106 are present, and/or whether vehicle operations data (or signals) pertaining to the first failure mode of the first subsystem are present. This dependency model can thus be used to evaluate and/or analyze diagnostic conditions and/or vehicle operations signals with respect to multiple subsystems while considering the interrelationships of operation (or failure modes) among these multiple subsystems.

In step 360, an artificial intelligence (AI) classifier is developed and/or designed based on the dependency model generated in step 340. The AI classifier can be developed and/or designed based on the causal relationships identified in the dependency model. Various techniques known to those skilled in the art concerning the design, development, and/or generation of AI classifiers or other information used as a part of an AI or machine learning (ML) technique or network can be used. The method 300 continues to step 370.

In step 370, fault diagnosis and analysis is carried out using the dependency model. As mentioned in step 250 of the method 200 above, many different types of fault diagnosis and analysis can be carried out. In an exemplary embodiment, the AI classifier obtained in step 360 can be used by an AI computer application or network to diagnose problems of one or more vehicles based on historical diagnostic data and/or historical vehicle operation signals data stored in databases 84. The AI computer application, which can be executed at the remote computers 78 and/or servers 82, can also be operated using real-time data from the one or more vehicles—that is, for example, diagnostic data and/or vehicle operation signals data can be detected and sent to the backend facility 80 in real-time and, then, the backend facility 80 can execute the AI computer application using this real-time diagnostic data and/or vehicle operation signals data. The method 300 then ends.

In one embodiment, the method 200, the method 300, and/or step(s) or parts thereof can be implemented in one or more computer programs (or "applications", or "scripts") embodied in one or more computer readable mediums and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

The computer program(s), including the DFMEA augmentation application and the vehicle fault diagnosis and/or analysis application, can be embodied on computer readable media (e.g., memory of the vehicle 12 (e.g., memory 38, other vehicle memory, memory of the remote computers 78, memory of the backend facility 80, a combination thereof), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

What is claimed is:

1. A method of performing fault diagnosis and analysis for one or more vehicles, comprising the steps of:
by one or more processors, obtaining design failure mode and effect analysis (DFMEA) data, wherein the DFMEA data specifies a plurality of failure modes of subsystems of the vehicle;
by one or more processors, receiving diagnostic association data, wherein the diagnostic association data specifies, for each of a first set of the plurality of failure modes, diagnostic data that is associated with the failure mode, the diagnostic data associated with the failure modes including diagnostic trouble codes (DTCs) associated with the failure modes, respectively, wherein at least one DTC included in a first set of DTCs associated with a first vehicle subsystem is also included in a second set of DTCs associated with a second vehicle subsystem that is different than the first vehicle subsystem;
by one or more processors, receiving vehicle operation signals association data, wherein the vehicle operation signals association data specifies, for each of a second set of the plurality of failure modes, vehicle operation signals data that is associated with the failure mode;
by one or more processors, generating augmented DFMEA data that indicates a causal relationship between the diagnostic data and the first set of failure modes indicated by the diagnostic association data, and that indicates a causal relationship between the vehicle operation signals data and the second set of failure modes indicated by the vehicle operation signals association data, wherein the augmented DFMEA data is generated based on the DFMEA data, the diagnostic association data, and the vehicle operation signals association data;
by one or more processors, generating a dependency model based on the augmented DFMEA data, wherein the dependency model indicates causal relationship(s) between the first subsystem failure modes and the second subsystem failure modes;
by one or more processors, performing fault diagnosis and analysis for the one or more vehicles using the dependency model, the fault diagnosis and analysis including, based on the at least one DTC being included in both the first and second sets of DTCs associated with the first and second vehicle subsystems, respectively, diagnosing a failure in the first vehicle subsystem and not the second vehicle subsystem; and
by one or more processors, displaying the diagnosis on a display.

2. The method of claim 1, wherein the DFMEA data includes or is based on a first DFMEA document that is generated as a part of designing, developing, manufacturing, and/or testing a first subsystem of the one or more vehicles, wherein the DFMEA data includes or is based on a second DFMEA document that is generated as a part of designing, developing, manufacturing, and/or testing a second subsystem of the one or more vehicles.

3. The method of claim 2, wherein the plurality of failure modes includes a plurality of first subsystem failure modes and a plurality of second subsystem failure modes, wherein the plurality of first subsystem failure modes specifies failure modes pertaining to the first subsystem, and wherein the plurality of second subsystem failure modes specifies failure modes pertaining to the second subsystem.

4. The method of claim 3, wherein the augmented DFMEA data includes a first augmented DFMEA document and a second augmented DFMEA document, wherein the first augmented DFMEA document indicates the causal relationship between the diagnostic data and a third set of failure modes, wherein the third set of failure modes are those failure modes that are a part of the first set of failure modes and the first subsystem failure modes, wherein the first augmented DFMEA document indicates the causal relationship between the vehicle operation signals data and a fourth set of failure modes, and wherein the fourth set of failure modes are those failure modes that are a part of the second set of failure modes and the first subsystem failure modes.

5. The method of claim 4, wherein the second augmented DFMEA document indicates the causal relationship between the diagnostic data and a fifth set of failure modes, wherein the fifth set of failure modes are those failure modes that are a part of the first set of failure modes and the second subsystem failure modes, wherein the second augmented DFMEA document indicates the causal relationship between the vehicle operation signals data and a sixth set of failure modes, and wherein the sixth set of failure modes are those failure modes that are a part of the second set of failure modes and the second subsystem failure modes.

6. The method of claim 5, wherein the causal relationship(s) are identified based on the first augmented DFMEA document and the second augmented DFMEA document.

7. The method of claim 1, wherein the diagnostics association data is received from a first technical specialist at a first computer, and wherein the vehicle operation signals association data is received from a second technical specialist at a second computer.

8. The method of claim 1, wherein the fault diagnosis and analysis includes generating an artificial intelligence (AI) classifier based on the augmented DFMEA data.

9. The method of claim 8, wherein the fault diagnosis and analysis includes executing an AI computer application to diagnose the one or more vehicles based on observed diagnostic data and/or observed vehicle operation signals data pertaining to the one or more vehicles, and wherein the AI computer application is configured to use the AI classifier to diagnose the one or more vehicles.

10. The method of claim 9, further comprising the step of sending a message to at least one of the one or more vehicles, wherein the message indicates a particular failure mode of the plurality of failure modes that is identified based on the diagnosis performed using the AI computer application.

11. The method of claim 1, wherein the fault diagnosis and analysis includes determining whether each of the plurality of failure modes are isolatable from one another.

12. A method of performing fault diagnosis and analysis for one or more vehicles, comprising the steps of:
  by one or more processors, obtaining design failure mode and effect analysis (DFMEA) data, wherein the DFMEA data specifies a plurality of failure modes including first vehicle subsystem failure modes and second vehicle subsystem failure modes;
  by one or more processors, receiving diagnostic association data, wherein the diagnostic association data specifies, for each of a first set of the plurality of failure modes of the first vehicle subsystem, one or more diagnostic trouble code(s) (DTC(s)) that are associated with that failure mode and, for each of a second set of the plurality of failure modes of the second vehicle subsystem, one or more DTCs that are associated with that failure mode,
  wherein at least one DTC included in a first set of DTCs associated with the first vehicle subsystem is also included in a second set of DTCs associated with the second vehicle subsystem that is different than the first vehicle subsystem;
  by one or more processors, receiving vehicle operation signals association data, wherein the vehicle operation signals association data specifies, for each of a second set of the plurality of failure modes, vehicle operation signals data that is to be associated with the failure mode;
  generating augmented DFMEA data that indicates the DTC(s) that are observable at the one or more vehicles when the one or more vehicles are experiencing any failure mode(s) of the first set of failure modes, and that indicates the vehicle operation signals data that is observable at the one or more vehicles when the one or more vehicles are experiencing any failure mode(s) of the second set of failure modes, wherein the augmented DFMEA data is generated based on the DFMEA data, the diagnostic association data, and the vehicle operation signals association data;
  generating a dependency model based on the augmented DFMEA data, wherein the dependency model indicates causal relationships between the first subsystem failure modes and the second subsystem failure modes;
  performing fault diagnosis and analysis for the one or more vehicles using the dependency model, the fault diagnosis and analysis including, based on the at least one DTC being included in both the first and second sets of DTCs associated with the first and second vehicle subsystems, respectively, diagnosing a failure in the first vehicle subsystem and not the second vehicle subsystem; and
  by one or more processors, displaying the diagnosis on a display.

13. The method of claim 12, wherein the fault diagnosis and analysis includes: obtaining observed diagnostic data and observed vehicle operation signals data pertaining to at least one of the one or more vehicles, and identifying a failure mode of the at least one vehicle by comparing the observed diagnostic data to diagnostic data as indicated in the dependency model and by comparing the observed vehicle operation signals data to vehicle operation signals data as indicated in the dependency model.

14. The method of claim 12, wherein a first portion of the diagnostics association data is received from a first technical specialist at a first computer and a second portion of the diagnostics association data is received from a second technical specialist at a second computer.

15. The method of claim 14, wherein a first portion of the vehicle operation signals association data is received from a third technical specialist at a third computer and a second portion of the vehicle operation signals association data is received from a fourth technical specialist at a fourth computer.

16. The method of claim 12, wherein the method is carried out by one or more computers that are located remotely from the one or more vehicles.

17. A vehicle fault diagnosis and analysis system, comprising:
  one or more computers each having one or more processors; and
  memory storing computer instructions that are executable by the one or more computers, wherein the memory is communicatively coupled to the one or more computers;
  wherein, when the computer instructions are executed by the one or more computers, the vehicle fault diagnosis and analysis system:
    obtains augmented design failure mode and effect analysis (DFMEA) data that indicates diagnostic data that is observable at one or more vehicles when the one or more vehicles are experiencing any failure mode(s) of a first set of failure modes, and that indicates vehicle operation signals data that is observable at the one or more vehicles when the one or more vehicles are experiencing any failure mode(s) of a second set of failure modes, wherein the augmented DFMEA data is generated based on DFMEA data, diagnostic association data, and vehicle operation signals association data, wherein the augmented DFMEA data indicates that at least one DTC included in a first set of diagnostic trouble codes (DTCs) associated with a first vehicle subsystem is also included in a second set of DTCs associated with a second vehicle subsystem that is different than the first vehicle subsystem;

generates a dependency model based on the augmented DFMEA data, wherein the dependency model indicates causal relationship(s) between the first subsystem failure modes and the second subsystem failure modes;

performs fault diagnosis and analysis for the one or more vehicles using the augmented DFMEA data, the fault diagnosis and analysis including, based on the at least one DTC being included in both the first and second sets of DTCs associated with the first and second vehicle subsystems, respectively, diagnosing a failure in the first vehicle subsystem and not the second vehicle subsystem; and displays the diagnosis on a display.

18. The vehicle fault diagnosis and analysis system of claim 17, wherein the augmented DFMEA data is generated by a DFMEA augmentation application that is executable by one or more remote computers, wherein, when the DFMEA augmentation application is executed, the one or more remote computers:

obtain the DFMEA data, wherein the DFMEA data specifies a plurality of failure modes including the first set of failure modes and the second set of failure modes;

receive the diagnostic association data, wherein the diagnostic association data specifies, for each of the first set of failure modes, one or more diagnostic trouble code(s) (DTC(s)) that are to be associated with the failure mode;

receive the vehicle operation signals association data, wherein the vehicle operation signals association data specifies, for each of the second set of failure modes, vehicle operation signals data that is to be associated with the failure mode;

generate the augmented DFMEA data; and provide the augmented DFMEA data to the one or more computers of the vehicle fault diagnosis and analysis system.

19. The vehicle fault diagnosis and analysis system of claim 18, wherein the one or more remote computers are separate from the one or more computers of the vehicle fault diagnosis and analysis system.

20. The vehicle fault diagnosis and analysis system of claim 19, wherein the vehicle fault diagnosis and analysis system is controlled by an original equipment manufacturer (OEM) of the one or more vehicles, wherein the DFMEA augmentation application is provided by the OEM to a supplier that provides parts to the OEM for the one or more vehicles, and wherein the supplier controls the one or more remote computers.

* * * * *